United States Patent [19]
Reichenmiller et al.

[11] Patent Number: 5,852,931
[45] Date of Patent: Dec. 29, 1998

[54] AUTOMATIC TRANSMISSION WITH A POSITIVE-DISPLACEMENT PUMP

[75] Inventors: Michael Reichenmiller, Waldstetten; Gerald Rowe, Lindau; Franz Lacher, Meckenbeuren; Wolf-Dieter Schmid, Lindau, all of Germany

[73] Assignee: ZF Friedrichshafen AG, Friedrichshafen, Germany

[21] Appl. No.: 809,894

[22] PCT Filed: Sep. 29, 1995

[86] PCT No.: PCT/EP95/03850

§ 371 Date: Apr. 7, 1997

§ 102(e) Date: Apr. 7, 1997

[87] PCT Pub. No.: WO96/11346

PCT Pub. Date: Apr. 18, 1996

[30] Foreign Application Priority Data

Oct. 5, 1994 [DE] Germany .......................... 44 35 593.9

[51] Int. Cl.[6] .............................. F16D 33/00; F04B 1/04; F16H 57/04
[52] U.S. Cl. ................................. 60/339; 60/330
[58] Field of Search .............................. 60/339, 358, 330

[56] References Cited

U.S. PATENT DOCUMENTS 5,645,406 7/1997 Rowe et al. ........................... 74/730.1

FOREIGN PATENT DOCUMENTS 1528568 9/1970 Germany .

Primary Examiner—Sheldon J. Richter
Attorney, Agent, or Firm—Larson & Taylor

[57] ABSTRACT

An automatic transmission, in particular an infinitely variable automatic transmission for motor vehicles, contains a radial piston pump (1) for supplying a hydrodynamic converter (3), a lubricating device and control and actuating devices of the automatic transmission via a number of control conduits. Radially outside of its outlet valves, the radial piston pump (1) contains an annular chamber (22), which extends around the radial piston pump (1). The annular chamber (22) is embodied as a damping chamber and is mainly arranged in a recess (23) of the converter housing (2), and therefore almost completely outside of the pump housing (17). The annular chamber (22) is bordered by the recess (23) of the converter housing (2), the pump housing (17) and/or a separate pump cover (24). The annular chamber (22) is not symmetric and with its volume extends into the adjoining free spaces of the automatic transmission.

20 Claims, 1 Drawing Sheet ical section and its volume are considerably increased. This is achieved in that the annular chamber is relocated from the pump housing into a recess in the converter housing or a recess of the pump cover which adjoins the pump housing. The damping chamber then is located almost completely outside of the pump housing. However, a small partial volume of the damping chamber can also be employed for damping in the chambers of the pump housing which exist for structural reasons.

AUTOMATIC TRANSMISSION WITH A POSITIVE-DISPLACEMENT PUMP

BACKGROUND OF THE INVENTION

1. Field of the Invention

The invention relates to an automatic transmission, in particular an infinitely variable automatic transmission for motor vehicles, including a positive displacement pump for supplying a hydrodynamic converter, a lubricating device and control and actuating devices for the automatic transmission via a number of control conduits. In this case the positive displacement pump has a collecting chamber located radially outside a number of outlet valves, which is designed as an annular chamber and extends around the positive displacement pump. The annular chamber is arranged between a pump housing and a converter housing of the converter.

2. Description of the Prior Art

An automatic transmission of this type is known from DE-A1 41 39 611. High demands for a low noise level are made on transmissions of this type. Among other reasons, noise occurs in such transmissions because of pulsations of the positive displacement pump and oscillations generated by these pulsations.

A possibility of keeping noise in automatic transmissions low lies in damping the pulsations. A collecting annular groove or a collecting chamber designed as an annular chamber, located radially outside the pump, is provided for this purpose in the known automatic transmission, which acts to dampen the pulsations to some extent. An improvement of this damping by enlarging the collecting chamber would be desirable. However, limitations are placed on such an enlargement, since the diameter of the cylindrical fitting in the converter housing in which the pump housing is maintained cannot be arbitrarily enlarged. These limitations are defined in that peripheral units, such as a differential or control and pressure conduits, for example, must be arranged very close to the positive displacement pump for construction and functional reasons.

SUMMARY OF THE INVENTION

It is the object of the invention to reduce the generated noises by increased damping of the pulsations of the positive displacement pump.

This object is attained by means of the automatic transmission of the present invention. To this end, the annular chamber is designed as a damping chamber, i.e. its cross section and its volume are considerably increased. This is achieved in that the annular chamber is relocated from the pump housing into a recess in the converter housing or a recess of the pump cover which adjoins the pump housing. The damping chamber then is located almost completely outside of the pump housing. However, a small partial volume of the damping chamber can also be employed for damping in the chambers of the pump housing which exist for structural reasons.

Advantageous and useful embodiments of the invention are described herein. However, the invention is not restricted to a combination of the characteristics of the invention. For one skilled in the art, further useful possibilities for combinations of claims features and individual characteristics result from the definition of the object.

The invention can be particularly used in automatic transmissions wherein the positive displacement pump is a radial piston pump. In general, radial piston pumps show higher pulsation than gear wheel pumps. However, radial piston pumps offer the possibility of a higher pressure level and suction regulation. Because of the design of the damping chamber in accordance with the invention, it is possible to employ radial piston pumps more advantageously in automatic transmissions, i.e. with less noise and fewer oscillations.

The annular chamber can be disposed in a one-piece converter housing, if the converter housing is produced by means of the sand-casting method, for example. In a comparative manner the annular chamber can also be arranged in the pump cover.

However, for production on an industrial scale it is useful to divide the converter housing. In this case the annular chamber is delimited by the recess in the converter housing, the pump housing and a separate pump cover. Here the radially exterior boundary wall and the axial boundary walls of the annular chamber are formed by the converter housing and the pump cover. In this case the converter housing can be produced by means of the diecast process.

Because of the way the annular chamber is arranged in the converter housing, the annular chamber can have an irregular shape, i.e. a shape differing from a circular ring. The volume of the annular chamber can be placed into the free spaces provided by the structure of the automatic transmission. The annular chamber can have constrictions or reductions in its cross section in the area of the peripheral units, for example by diminishing their cross section. At other places, however, the annular chamber can have widenings.

In known automatic transmissions, the converter housing has an essentially cylindrical extension, with whose free end a part of a clutch or a brake of the automatic transmission is connected. In the instant case, where the annular chamber is embodied to be "two-piece", i.e. is bordered by the converter housing and the pump cover, the cylindrical extension is placed on the pump cover. The part against which the connecting elements with the clutch or the brake are placed is made considerably smaller by this and can therefore be worked more simply and cost-effectively.

If the pump housing is centered in respect to the pump cover, a gasket is advantageously used for sealing between these two parts. An O-ring seal is used between the converter housing and the pump housing, which is placed into a radially open annular groove of the converter housing or the pump housing.

Only some combinations in respect to the design and use are extensively represented in the specification and the claims. It is recommended to the reader to also consider each statement individually by itself and to test its usefulness in other connections and combinations, and to do this in particular in connection with the recited prior art. Possibilities will suggest themselves to one skilled in that art if the described steps are employed because of the advantages connected with them.

The invention will be explained in more detail in what follows by means of two exemplary embodiments represented in the drawings. Shown in:

DETAILED DESCRIPTION OF THE PREFERRED EMBODIMENT

Figure 1:
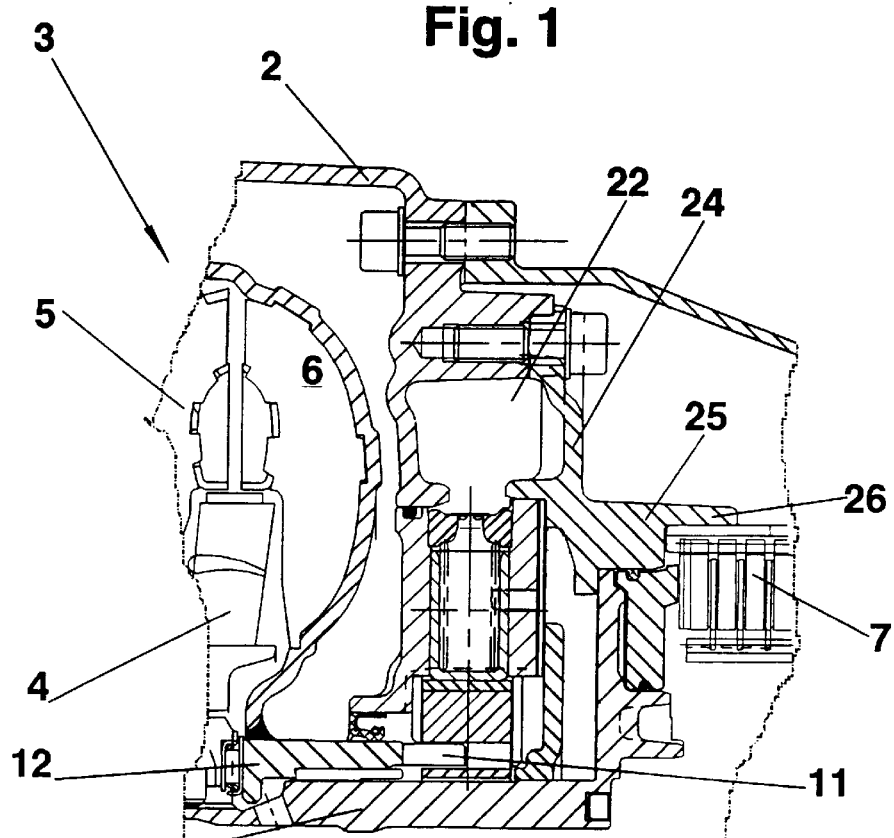
FIG. 1, a partial longitudinal section through the automatic transmission in accordance with the invention in the area of the positive displacement pump with a "two-piece" damping chamber, and FIG. 2, a portion from FIG. 1 in a second exemplary embodiment with a "one-piece" damping chamber.

A positive displacement pump in the form of a radial piston pump 1 is disposed in a converter housing 2. The converter housing 2 furthermore contains a starting device in the form of a hydrodynamic converter 3 with a guide wheel 4, a turbine wheel 5 and a pump wheel 6.

The radial piston pump 1 directly adjoins the converter 3. The actual transmission, of which only a switch brake 7 is shown, is located on the other side of the radial piston pump 1.

The guide wheel 4 is seated on a guide wheel shaft 8 fixed on the housing. An eccentric slide bushing 10 of the radial piston pump 1 is seated on the guide wheel shaft 8. The eccentric slide bushing 10 is driven by a pin 11, which is embodied as the axial extension of a pump shaft 12 connected with the pump wheel 6. Several pistons 14 are connected via at least one slide ring 13 with the eccentric slide bushing 10. The pistons are held by means of their piston bottoms on the inside against the slide ring 13 by the force of springs 15. The pistons 14 slide in cylinder bores 16 of a pump housing 17. The cylinder bores 16 are closed by plugs 18. Each plug 18 is provided with a bore 20. A check valve is formed on each plug 18 in that all plugs 18 are encircled by a common belt spring 21. The spring 21 seals the bore 20 against a damping chamber radially lying outside of the plugs and embodied as an annular chamber 22.

In the exemplary embodiment the annular chamber 22 is bordered by a recess 23 of the converter housing 2, by the pump housing 17 and a separate pump cover 24. The pump cover 24 adjoins the pump housing 17 in the direction toward the actual transmission. The annular chamber therefore is mainly located in the recess 23 of the converter housing and thus almost completely outside of the pump housing 17. Because of this, the annular chamber 22 can be extended into all chambers of the automatic transmission which are, for structural reasons, empty and adjoin the radial piston pump 1. Only in the area of peripheral units, for example a differential, or in the area of conduit passages, does the annular chamber have constrictions or reductions in its cross section.

The pump cover 24 has an axially directed, essentially cylindrical extension 25, with whose free end 26, which faces away from the pump housing 17, a part of the switch brake 7 is connected.

The annular chamber 22 is sealed on the one side between the converter housing 2 and the pump housing 17 by means of an O-ring seal 27, which lies in a radially open annular groove of the converter housing 2 or the pump housing 17, and on the other side by a gasket 28 between the pump housing 17 and the pump cover 24. A further seal is located between the converter housing 2 and the pump cover 24.

Figure 2:
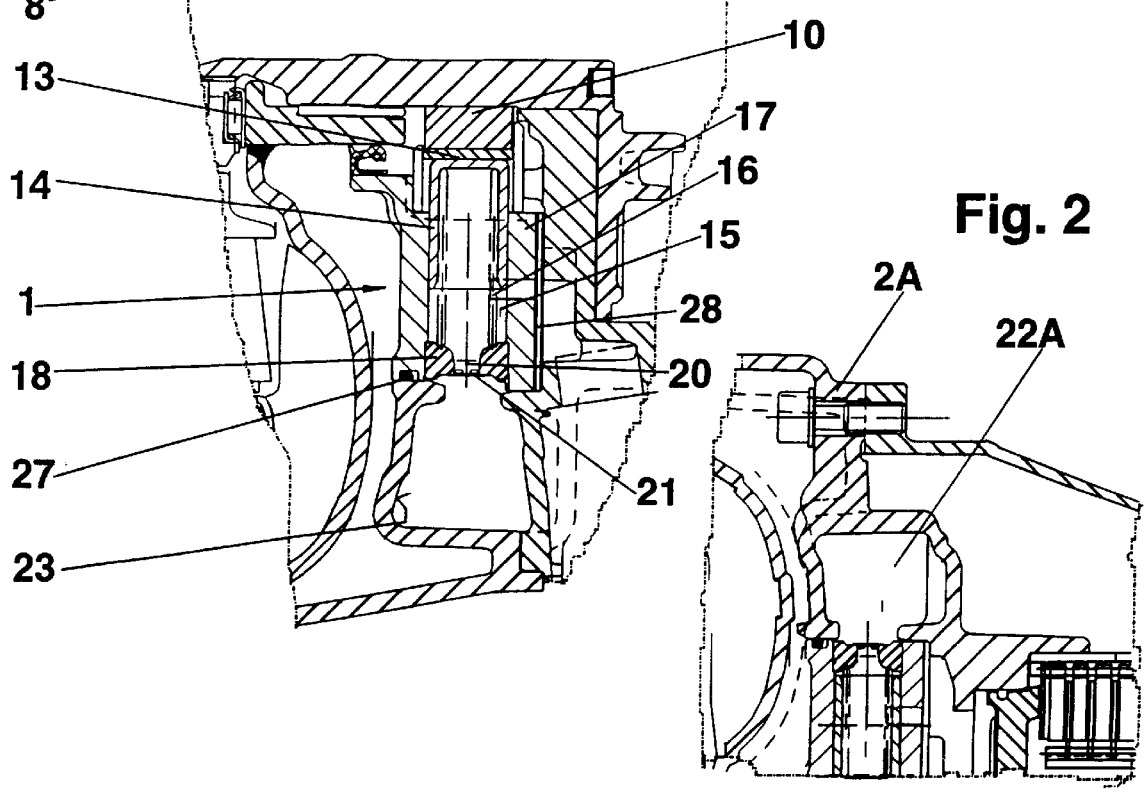

In the preferred exemplary embodiment, the annular chamber 22 is embodied to be "two-piece", i.e. is bordered by the converter housing 2 and the pump cover 24. In accordance with FIG. 2, the damping chamber can also be embodied as a "one-piece" annular chamber 24A in the converter housing 2A or in the pump cover 24 with the same advantages in the size and design of the chamber, but with certain trade-offs regarding its manufacture. The disposition of the annular chamber in the pump cover 24 corresponds to the embodiment in the converter housing 2A and is therefore not shown separately.

We claim:

1. An infinitely variable automatic transmission for motor vehicles comprising a positive displacement pump for supplying a hydrodynamic converter provided with a converter housing, a lubricating device and from control and actuating devices of the automatic transmission, a number of control conduits, wherein the positive displacement pump has a collecting chamber located radially outside a number of outlet valves, which collecting chamber is an annular chamber and extends around the positive displacement pump;

wherein the annular chamber which is used as damping chamber is arranged between a pump housing and the converter housing of the converter, the improvement comprising that the annular chamber is essentially arranged in a recess of the converter housing and therefore lies essentially outside of the pump housing, and that the annular chamber is limited in size in the axial direction by the converter housing and/or the pump cover.

2. The automatic transmission in accordance with claim 1, wherein the positive displacement pump is a radial piston pump.

3. The automatic transmission in accordance with claim 2, wherein the annular chamber is only bordered by the pump housing and the converter housing.

4. An infinitely variable automatic transmission for motor vehicles, comprising a positive displacement pump for supplying a hydrodynamic converter provided with a converter housing, a lubricating device and from control and actuating devices of the automatic transmission, a number of control conduits, wherein the positive displacement pump has a collecting chamber located radially outside a number of outlet valves, which collecting chamber is designed as an annular chamber and extends around the positive displacement pump;

wherein the annular chamber, used as a damping chamber, is arranged between a pump housing and the converter housing of the converter, the improvement comprising that the annular chamber is essentially arranged in a recess of a pump cover, which adjoins the pump housing and is only bordered by the pump housing and the pump cover.

5. The automatic transmission in accordance with claim 4 wherein the annular chamber is bordered by recesses of the converter housing, of the pump housing and/or of a separate pump cover.

6. The automatic transmission in accordance with claim 5, wherein the annular chamber includes a radially exterior boundary wall and axial boundary walls and the radially extending boundary wall and the axial boundary walls of the annular chamber are formed by the converter housing and the pump cover.

7. The automatic transmission in accordance with claim 1 wherein the annular chamber has a shape other than a circular ring shape.

8. The automatic transmission in accordance with claim 7, wherein the annular chamber has a circumference and on its circumference the annular chamber (22) has widenings and reductions in its cross section.

9. The automatic transmission in accordance with claim 8, wherein the reductions of the cross section of the annular chamber lie in the area of the peripheral units or conduit passages arranged next to the annular chamber.

10. The automatic transmission in accordance with claim 6, wherein the pump cover has an axial, essentially cylindrical extension having a free end, which faces away from the pump housing and with which, a part of a clutch or a brake of the automatic transmission is connected.

11. The automatic transmission in accordance with claim 1 wherein the annular chamber is sealed on the one side between the converter housing and the pump housing by means of an O-ring seal which lies in a radially open annular groove of the converter housing or of the pump housing, and on another side by a gasket between the pump housing and the pump cover.

12. The automatic transmission in accordance with claim 4 wherein the annular chamber has a shape other than a circular ring shape.

13. The automatic transmission in accordance with claim 12, wherein the annular chamber has a circumference and on its circumference the annular chamber has widenings and reductions in its cross section.

14. The automatic transmission in accordance with claim 13, wherein the reductions of the cross section of the annular chamber lie in the area of peripheral units or conduit passages arranged next to the annular chamber.

15. The automatic transmission in accordance with claim 4 wherein the annular chamber is sealed on one side between the converter housing and the pump housing by means of an O-ring seal which lies in a radially open annular groove of the converter housing or of the pump housing, and on another side by a gasket between the pump housing and the pump cover.

16. The automatic transmission in accordance with claim 7 wherein the annular chamber is sealed on one side between the converter housing and the pump housing by means of an O-ring seal which lies in a radially open annular groove of the converter housing or of the pump housing, and on another side by a gasket between the pump housing and the pump cover.

17. The automatic transmission in accordance with claim 9 wherein the annular chamber is sealed on one side between the converter housing and the pump housing by means of an O-ring seal which lies in a radially open annular groove of the converter housing or of the pump housing, and on another side by a gasket between the pump housing and the pump cover.

18. The automatic transmission in accordance with claim 10 wherein the annular chamber is sealed on one side between the converter housing and the pump housing by means of an O-ring seal which lies in a radially open annular groove of the converter housing or of the pump housing, and on another side by a gasket between the pump housing and the pump cover.

19. The automatic transmission in accordance with claim 12 wherein the annular chamber is sealed on one side between the converter housing and the pump housing by means of an O-ring seal which lies in a radially open annular groove of the converter housing or of the pump housing, and on another side by a gasket between the pump housing and the pump cover.

20. The automatic transmission in accordance with claim 14 wherein the annular chamber is sealed on one side between the converter housing and the pump housing by means of an O-ring seal which lies in a radially open annular groove of the converter housing or of the pump housing, and on another side by a gasket between the pump housing and the pump cover.

* * * * *